April 7, 1931.  J. L. BAIRD  1,800,044
APPARATUS FOR PRODUCING A VARYING LIGHT OR ILLUMINATION
Filed Oct. 7, 1927  2 Sheets-Sheet 1

INVENTOR
John L. Baird,
BY Watson, Coit, Morse & Grindle
ATTYS.

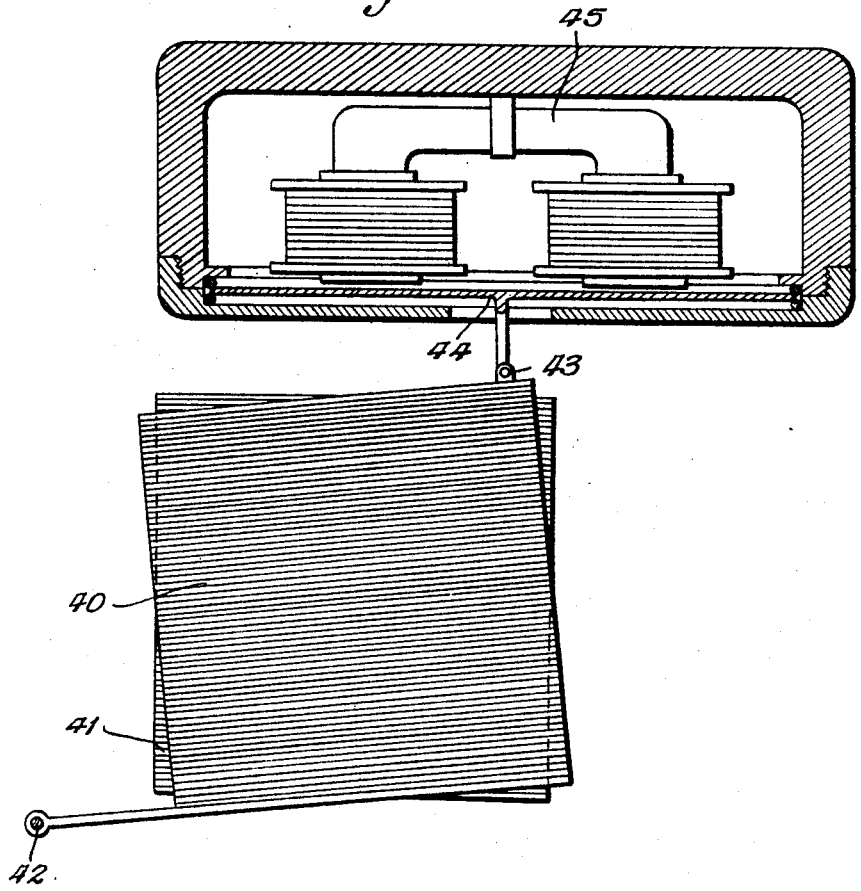

Patented Apr. 7, 1931

1,800,044

UNITED STATES PATENT OFFICE

JOHN LOGIE BAIRD, OF LONDON, ENGLAND, ASSIGNOR TO TELEVISION LIMITED, OF LONDON, ENGLAND, A BRITISH COMPANY

APPARATUS FOR PRODUCING A VARYING LIGHT OR ILLUMINATION

Application filed October 7, 1927, Serial No. 224,712, and in Great Britain December 3, 1926.

In apparatus for producing a varying light or illumination it has been proposed to use in front of the source of light two grids movable relatively to each other so that when the spaces in the grids coincided light could pass, but when the spaces in one grid were covered by the bars of the other grid no light could pass, and in intermediate positions the quantity of light passing was correspondingly reduced.

In such devices as hitherto used, the grids have been of comparatively stout construction and of coarse spacing, so that they possessed a certain amount of weight and inertia, and also a substantial amount of relative motion was necessary to produce the change from minimum to maximum illumination. These conditions prevented such devices being used in circumstances where extremely rapid movement was required.

In order to overcome these disadvantages the present invention provides apparatus for producing a varying light or illumination comprising two transparent plates each ruled with closely-spaced black lines such as are used for diffraction gratings. The movable plate is made of very light material, such as thin glass, and means are provided for moving the plate in its own plane in a direction normal to the lines upon it. Means may be provided for adjusting one plate which is normally stationary, so as to bring it into the desired setting relatively to the other movable plate. In a modified arrangement both plates may be movable.

The two plates may be arranged with the lines of one parallel with the lines on the other, or according to another feature of the invention, the plates may be arranged with the lines of one inclined at a very small angle to the lines on the other, and means may be provided for moving one of the plates with either a rotary or a rectilinear movement in its own plane in the manner hereinafter described.

According to another feature of this invention, a hollow transparent container may be provided with gratings as above described on two opposite faces, and the vessel may be filled with a liquid such as nitro-benzene, whereof the refractive index can be varied by applying an electromagnetic or an electrostatic stress. By passing the light obliquely through the vessel so that it passes through both gratings, the degree of registration of the two gratings with one another can be varied by variation of the refractive index.

In the accompanying drawings—

Figure 7 is an elevational view of a device constructed in accordance with the modified form of the invention illustrated diagrammatically in Figures 3 and 4.

Like reference characters indicate like parts throughout the drawings.

Figure 1:
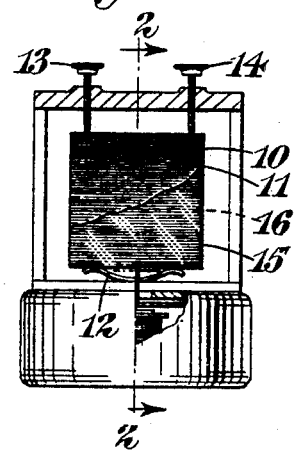
Figure 1 is a front elevation partly broken away.
Figure 2:
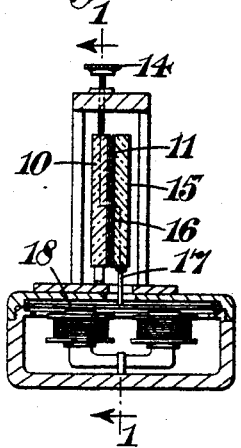
Figure 2 is a side elevation in section showing one embodiment of the present invention.

Referring first to Figures 1 and 2, these illustrate, although not to scale, a construction of device for producing a varying light or illumination suitable for use in a television system. A thin glass plate 10 is ruled on its face 11 with finely-spaced black lines, the lines being equal in width to the spaces between them. The spacing of the lines will be selected according to the particular requirements of any special case, but will be of the order of fifty to five-hundred lines per inch; that is to say, the width of the lines themselves is from one-hundredth to one-thousandth of an inch. It will be understood that the expressions "band" and "line" as used in the present specification and claims are intended as synonymous, each such term covering such dimensional variations in width and length as may be necessary for the purpose intended unless otherwise specified. The plate 10 is mounted in a suitable frame in such a manner that its alignment can be very finely adjusted. As illustrated, it is supported upon a spring 12 which presses it against two micrometer screws 13, 14 disposed near its opposite edges. This provides the equivalent of a three-point support so that by adjustment of the two screws 13, 14, the plate 10 can be readily and accurately adjusted. A second similar plate 15 similarly ruled on its face 16 is mounted close to the plate 10, but it is carried in any convenient manner so that small movements can be imparted to it. In the form illustrated, it is supported by a pin 17 from a diaphragm 18 which constitutes the armature of an electromagnet such for example as the diaphragm of a telephone. In the arrangement illustrated, the plate 15 is moved by the diaphragm vertically up and down in its own plane, and the two plates 10 and 15 are therefore arranged with their rulings horizontally so that the movement of the plate 15 opens to a greater or less extent the spaces between the lines on the plate 10, to permit more or less light to pass through. The plate 15 may be rigidly secured to the diaphragm 18, and the plate 10 is adjusted by means of the screws 13, 14, to set its rulings parallel to those of the plate 15.

Figure 4:
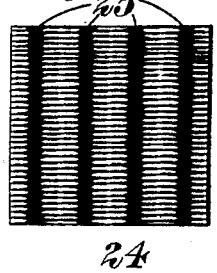
Figures 3 and 4 are diagrams illustrating a modified method of using the two gratings as above described.
Figure 3:
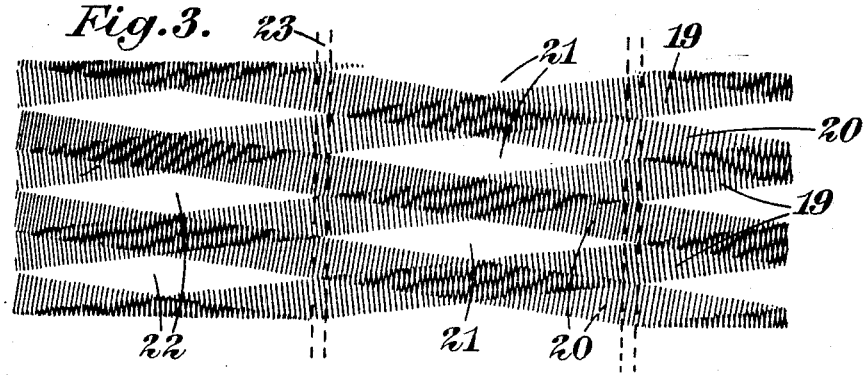

In a modified arrangement, the two plates are arranged with their rulings inclined at a small angle to one another. Figures 3 and 4 are diagrams illustrating this arrangement. In Figure 3 the black lines of one plate are indicated by the references 19, and on the other plate by the references 20. The two sets of lines are each opaque, but it will be seen that when they are inclined to one another, as illustrated, clear spaces 21 are provided through which light can pass, and these spaces give the appearance of a transparent band, which is separated from the similar spaces 22 forming another band, by an area 23 which is totally obscured, the lines 19 within the area 23 covering the gaps between the lines 20. As shown in Figure 3, the area 23 is a narrow strip, but if the inclination of the lines 19 to the lines 20 be reduced this area 23 is widened. Figure 4 is a representation of two grids set with their lines at a small angle to one another providing transparent spaces 24 and black or opaque bands 25. It will be seen that if one of the plates is moved relatively to the other, the opaque bands 23 or 25 will be moved relatively to the plates themselves, and such movement may be imparted to them by moving the plates either rectilinearly or angularly with respect to one another. In applying this arrangement to the present invention the plates are so set as to provide comparatively broad black or opaque bands and the movement of the opaque band is used to cover and uncover the source of light and thereby provide the varying illumination required.

Referring now to Figure 7 of the drawing it will be seen that the opaque lines or bands on the two plates 40 and 41 are inclined at a slight angle. As pointed out above, both of these plates may be moved if so desired, but for the purpose of illustration, plate 41 may be considered as fixed. Plate 40 is supported for pivotal movement as indicated at 42 and is connected at any convenient point 43 to a movable diaphragm or armature 44 which is actuated by the energization of the electromagnet 45. It will be observed that any change in the magnetic flux produced by the magnet 45 will result in angularly displacing plate 40 about the pivot 42, and thereby altering the angular relationship of the lines on the plates 40 and 41. It will be understood that if the opaque lines are sufficiently broad, the passage of light through the plates may be controlled if desired by a relative rectilinear movement of the plates rather than by an angular movement.

The control of the light may be effected by duplicating the apparatus and using two black bands which are moved simultaneously in opposite directions, in order to obtain an increased rate of movement. It will be appreciated that the black bands do not have sharp edges to them, so that the degree of illumination is gradually variable from the maximum to the minimum by movement of the band.

Figure 5:
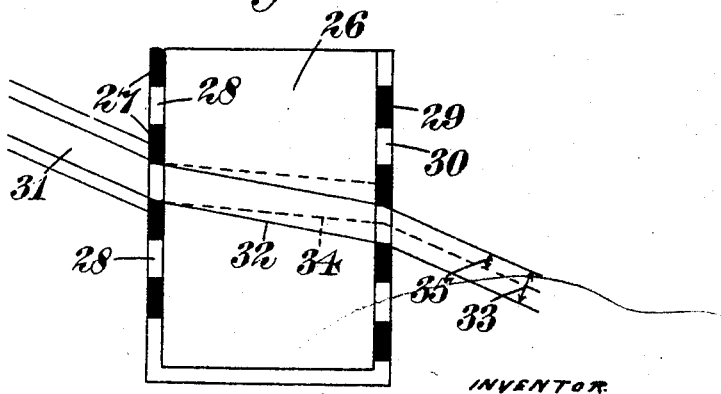
Figure 5 shows diagrammatically yet another modification.

Referring now to Figure 5, this represents in purely diagrammatic form a vessel 26 having transparent side walls which are ruled with gratings of the kind hereinbefore described; the opaque bands on one wall are indicated at 27 and the transparent spaces are shown at 28. The corresponding parts of the other wall are indicated at 29, 30 respectively.

The vessel is filled with nitro-benzene or other material of which the refractive index can be varied by applying electromagnetic or electrostatic stress to it. The light which is to be controlled is directed somewhat obliquely, as shown by the beam 31, upon one of the walls; part of this light is obscured by the opaque bands 27, so that a beam 32 passes through the interior of the vessel and impinges on the second wall. If the direction of the beam 31 is suitably chosen, the part 32 of the beam will pass out through one of the transparent spaces 30 on the second wall, as indicated at 33. If now the refractive index of the liquid be changed, the path of the beam 32 will be diverted to some such position as indicated by 34, with the result that the whole of the beam 32 does not register with one of the gaps 30 in the second screen, so that only a narrow beam 35 is transmitted. The quantity of light passing through the vessel has thereby been reduced and it will be appreciated that by imparting a sufficient deviation to the beam 32, the whole of it can be registered with one of the opaque lines 29 so that no light is transmitted through the device.

It will be seen that this device is similar in its operation to those first described, the only difference being that instead of moving the gratings relatively to one another, the equivalent effect is produced by refracting the light between two gratings.

Figure 6:
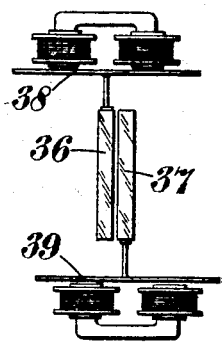
Figure 6 shows a modified construction of Figure 1.

Figure 6 illustrates a modified construction of apparatus which is similar to that in Figure 1 except that both plates are movable. The two plates are indicated at 36, 37 respectively, and each is mounted on a telephone diaphragm 38, 39 respectively, or some similar electromagnetically-controlled devices so as to be moved in accordance with the incoming signal. The preliminary setting of the two plates into the desired relative position may be effected by straining one of the diaphragms, or by moving it and its operating magnet bodily towards or away from the other diaphragm. The advantage of this construction is that the relative movement between the two screens is effected by moving both of them simultaneously, so that each is required to move through only half the distance. This permits more rapid working, since the inertia effects in the rapid reciprocation of the plates are diminished, and moreover, provides an easy method for applying more power to the operation of the device.

I claim:—

1. Apparatus for producing a variable light or illumination comprising a pair of relatively movable juxtaposed grids each of which presents a series of closely spaced bands opaque to light passing therethrough, the bands of one grid being inclined at a small angle to those of the other grid, and means responsive to high frequency electrical impulse variations for moving the grids relatively to each other to vary the quantity of light passed between the bands.

2. Apparatus for producing a variable light or illumination comprising a pair of relatively movable juxtaposed grids each of which presents a series of closely spaced bands opaque to light passing therethrough, the bands of one grid being inclined at a small angle to those of the other grid, and means responsive to high frequency electrical impulse variations for moving one grid angularly with respect to the other for varying the quantity of light passed between the bands.

3. Apparatus for producing a varying light or illumination comprising a pair of relatively movable transparent plates, one face of each plate being ruled with closely spaced opaque lines, the thickness of the lines and the spacing therebetween being no greater than one hundredth of an inch, means for supporting said plates with the lines of one inclined with respect to the lines of the other whereby minute relative movements of the plates serves to vary the quantity of light passing therethrough, and means responsive to high frequency electrical impulse variations for moving the grids relatively to each other for varying the quantity of light passed between the lines.

4. Apparatus for producing a varying light or illumination comprising a pair of relatively movable transparent plates, one face of each plate being ruled with closely spaced opaque lines, the thickness of the lines and the spacing therebetween being no greater than one hundredth of an inch, the lines of one plate being inclined with respect to those of the other plate, means for shifting the plates angularly with respect to each other for varying the quantity of light passing therethrough, and means responsive to high frequency electrical impulse variations for moving the grids relatively to each other for varying the quantity of light passed between the lines.

In testimony whereof I affix my signature.

JOHN LOGIE BAIRD.